United States Patent
Hwang et al.

(10) Patent No.: US 8,567,967 B2
(45) Date of Patent: Oct. 29, 2013

(54) HINGE CONSTRUCTION

(75) Inventors: Hyok-Joo Hwang, Bucheon (KR); Il-Sung Yu, Incheon (KR)

(73) Assignee: SMR Patents S.a.r.l., Luxembourg (LU)

( * ) Notice: Subject to any disclaimer, the term of this patent is extended or adjusted under 35 U.S.C. 154(b) by 265 days.

(21) Appl. No.: 12/888,677

(22) Filed: Sep. 23, 2010

(65) Prior Publication Data

US 2011/0069406 A1 Mar. 24, 2011

(30) Foreign Application Priority Data

Sep. 23, 2009 (EP) ..................................... 09171051

(51) Int. Cl.
*G02B 5/08* (2006.01)
*G02B 7/182* (2006.01)

(52) U.S. Cl.
USPC .......................................... 359/841; 359/877

(58) Field of Classification Search
None
See application file for complete search history.

(56) References Cited

U.S. PATENT DOCUMENTS

2008/0253008 A1 10/2008 Tseng
2008/0297927 A1* 12/2008 Onuki ........................... 359/841

FOREIGN PATENT DOCUMENTS

| DE | 3633010 | 4/1987 |
| EP | 1184222 | 3/2002 |
| EP | 1275558 | 6/2002 |
| EP | 1908633 | 4/2008 |

OTHER PUBLICATIONS

European Search Report for Application No. EP 09171051 dated Feb. 16, 2010.

* cited by examiner

*Primary Examiner* — Jade R Chwasz
(74) *Attorney, Agent, or Firm* — Reising Ethington PC

(57) ABSTRACT

A hinge construction for a wing mirror unit for a motor vehicle is proposed that comprises a first hinge part for mounting on the motor vehicle and a second hinge part, pivotably connected therewith via a shaft. The second hinge part supports a mirror frame of the wing mirror unit, wherein the shaft is connected with one hinge part and wherein the other hinge part is arranged pivotably about the shaft. The mirror frame has a location guide that corresponds with a location rib of a power fold module that is inserted into the frame.

11 Claims, 7 Drawing Sheets

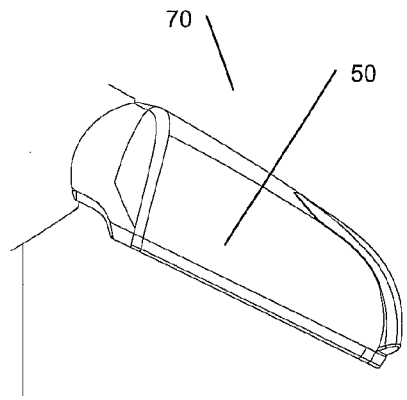
Figure 2a
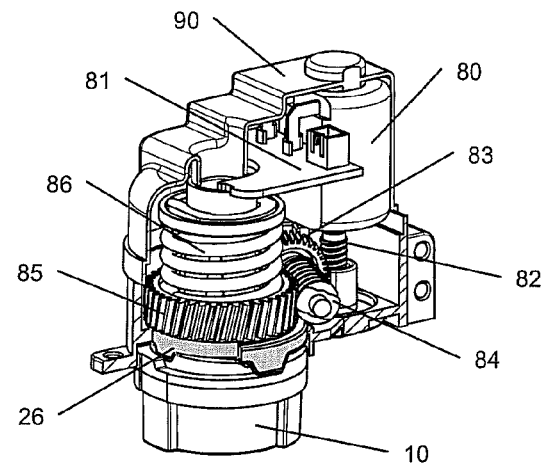
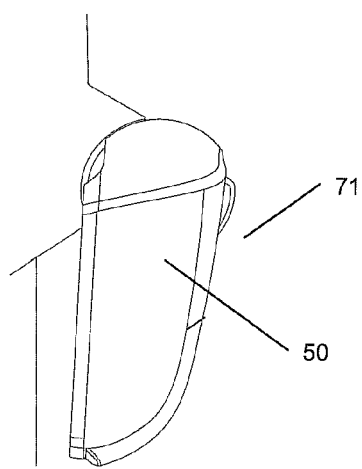
Figure 2b
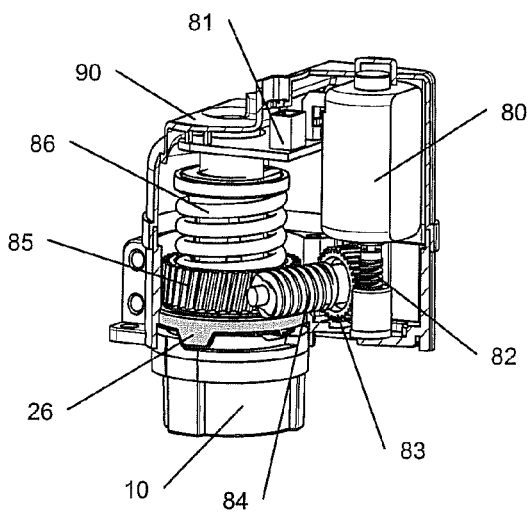
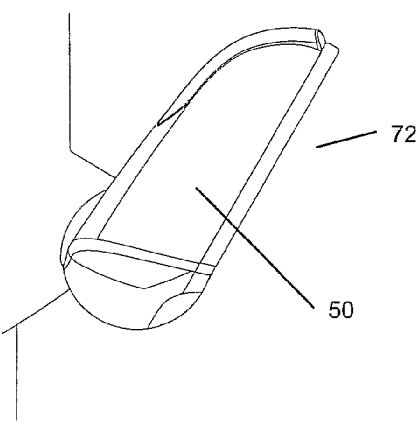
Figure 2c
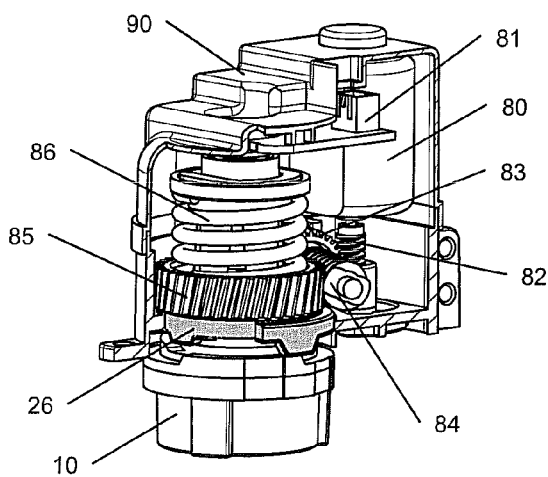

Section A-A of 5b    Section B-B of 5b

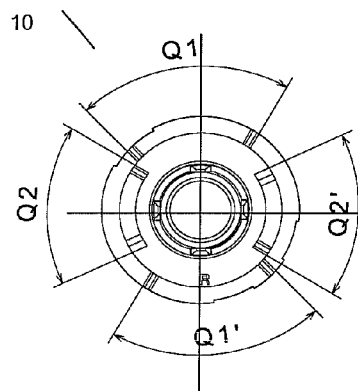
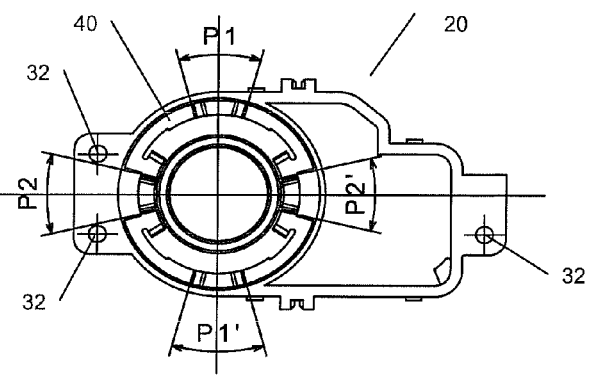
Figure 6a  Figure 6b
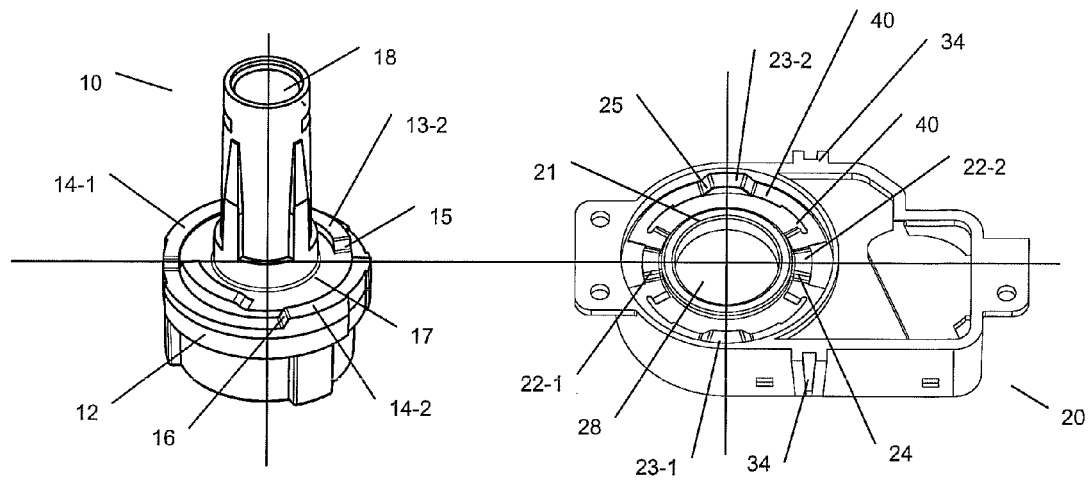
Figure 7a  Figure 7b

HINGE CONSTRUCTION

BACKGROUND ART

The invention is based on a priority patent application EP 09171051 which is hereby incorporated by reference.

FIELD OF THE INVENTION

The invention is related to a hinge construction for a wing mirror unit for a motor vehicle that comprises a first hinge part for mounting on the motor vehicle and a second hinge part, pivotably connected therewith via a shaft. The second hinge part supports a mirror frame of the wing mirror unit, wherein the shaft is connected with one hinge part.

More especially the invention provides a solution to fit the powerfold into the mirror frame.

In addition a solution is proposed to decouple motor of powerful efficient from the motor worm that transfers the forces into a wing mirror motion.

DESCRIPTION OF THE RELATED ART

This invention relates to a hinge construction, in particular for a wing mirror unit of a motor vehicle, comprising a first hinge part for mounting on a motor vehicle and a second hinge part, pivotably connected therewith, for supporting a mirror frame of the wing mirror unit. Such a hinge construction is generally known and typically comprises a first hinge part which is designed as a base plate for mounting on a door of an automobile. The base plate then mostly supports a fixed shaft of substantially upright orientation. The second hinge part typically comprises a mirror frame, arranged so as to be pivotable about the shaft. The mirror frame supports the components of the wing mirror, such as a mirror adjustment mechanism with mirror glass and a mirror housing.

By means of the hinge construction, the wing mirror is operatively adjustable between a folded-in position, in which the wing mirror substantially abuts alongside the body of the motor vehicle, and a folded-out position, in which the wing mirror is oriented substantially transversely to the body of the motor vehicle.

Through this adjustability, the wing mirror can be folded in from the folded-out operating position to a folded-in position in which the mirror housing projects less far with respect to the body. In this way, for one thing, the risk of damage to the wing mirror when parking the vehicle can be reduced and the wing mirror can yield to some extent upon collision with an object.

Typically, the hinge construction comprises an electric drive mechanism with which the wing mirror is adjustable between the folded-in position and the folded-out position. In connection with safety and aerodynamics, the wing mirror in the folded-out position is preferably placed as closely to the body as possible.

The electrical fold-in function of the wing mirror should not result in vibrations during driving. In addition the noise level of the motor drive must be as low as possible for OEM's purpose.

Another need of a wing mirror with a power fold equipment is that the assembly of the whole mirror must be as reliable as possible to avoid quality problems. In the EP 1908633 A1 a hinge construction is described that combine the mounting of gear elements in a rigid box. The worm gear is fixed between a separation element connected to the motor and a fixed housing lower part with a separate pin. This construction does not allow an easy mounting of the worm gear.

SUMMARY

To resolve all requirements, complex constructions have been proposed.

This invention contemplates an alternative construction, with which the same advantages can be achieved. In particular, the invention contemplates a simple, reliable construction with which the advantages can be achieved in a simple, operatively reliable manner. The invention shows a solution easy to mount and able to damp vibrations and motor noise.

To that end, the invention provides a hinge construction for a wing mirror unit for a motor vehicle, comprising a first hinge part for mounting on the motor vehicle and a second hinge part, pivotably connected therewith via a shaft, for supporting a mirror frame of the wing mirror unit, wherein the shaft is connected with one hinge part and wherein the other hinge part is arranged pivotably about the shaft and the power fold module is formed by a gear box and an upper case with a seal cover, wherein the upper case comprises a socket with an axis separation part between motor and motor worm and the motor worm is borne between a bearing in the socket and a worm cap bearing in the worm cap, characterized in that the worm cap bearing is part of a worm cap snapped to a supporter of the upper case.

By coupling the drive mechanism disengageably with one of the hinge parts, what can be achieved is that the drive mechanism can be uncoupled when from outside a high adjusting force is exerted on the hinge construction.

The invention also relates to a wing mirror unit, in particular for a motor vehicle, comprising a hinge construction, wherein the first hinge part is provided with a base plate for mounting on the body of a motor vehicle and wherein the second hinge part is provided with a wing mirror, and wherein the wing mirror is adjustable during use between a folded-in position, in which the wing mirror substantially abuts along the body of the motor vehicle, and a folded-out position, in which the wing mirror is oriented substantially transversely to the body of the motor vehicle.

BRIEF DESCRIPTION OF THE DRAWINGS

The invention is shown in the figures and shortly described there after.

FIG. 2a shows a top view showing the outside mirror and section view showing the power fold unit when the outside mirror is drive position. (fold-out position)

FIG. 2b shows a top view showing the outside mirror and section view showing the power fold unit when the outside mirror is park position. (fold-in position)

FIG. 2c shows a top view showing the outside mirror and section view showing the power fold module when the outside mirror is rotated forward due to the external impact. (fold-over position)

FIG. 6a shows a top view showing the flange of a shaft FIG. 6b shows a bottom view showing the gear box FIG. 7a Perspective view showing essential portion of a shaft FIG. 7b Perspective view showing essential portion of the gear box

DETAILED DESCRIPTION OF THE PREFERRED EMBODIMENT

Figure 1:
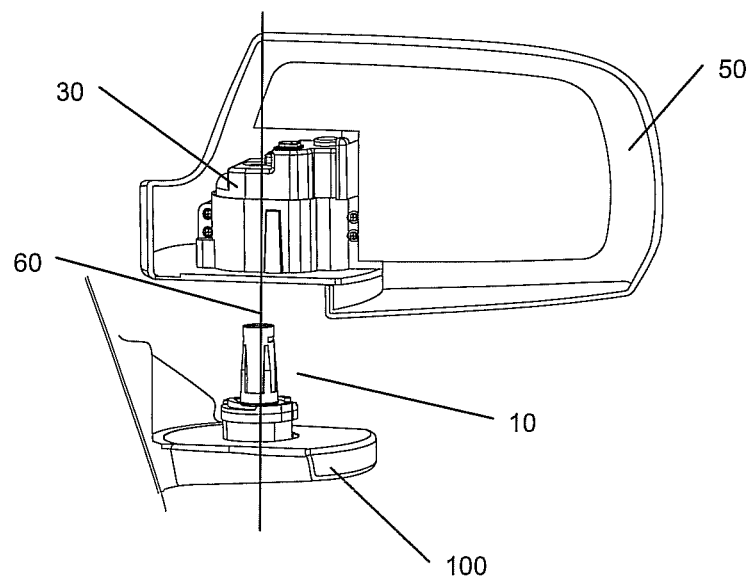
FIG. 1 shows a perspective view of a separated shaft (10) from said power fold module.
Figure 3:
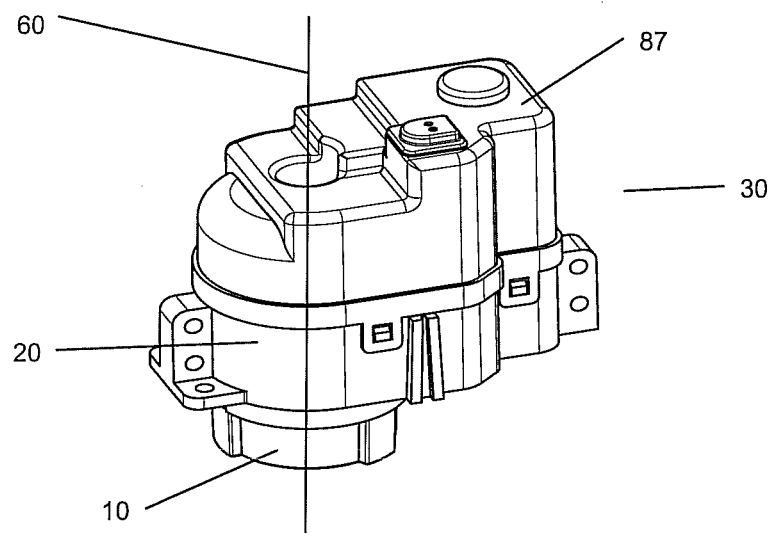
FIG. 3 shows a perspective view showing the power fold unit of this invention for outside mirror.
Figure 4:
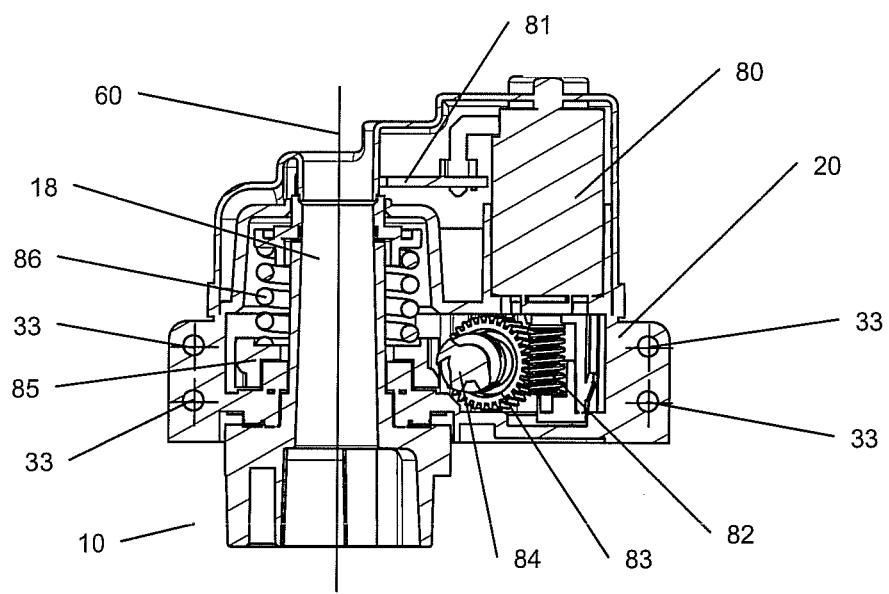
FIG. 4 shows a cross sectional view showing the power fold module of this invention for outside mirror
Figure 5A:
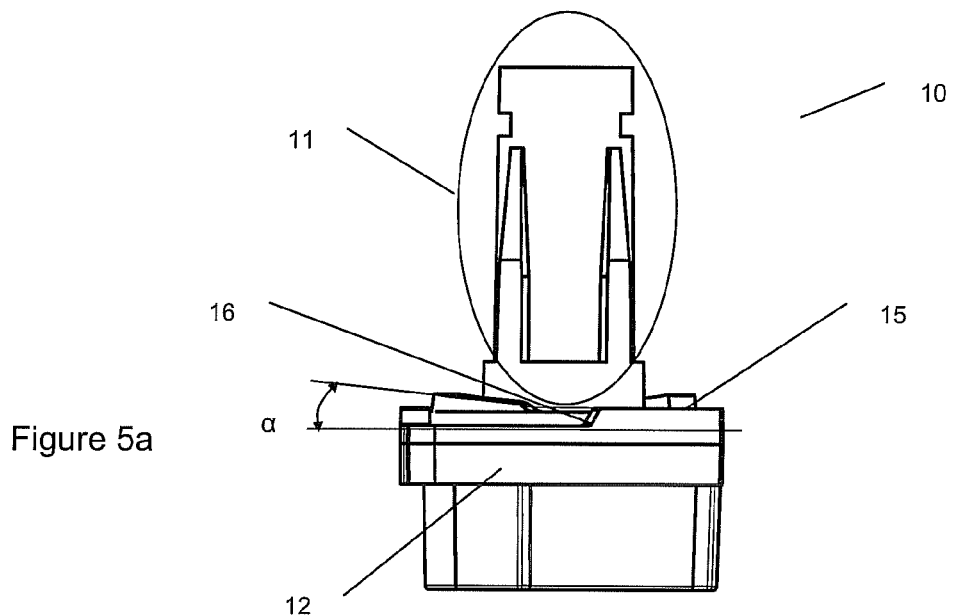
FIG. 5a shows a front view showing the shaft
Figure 5B:
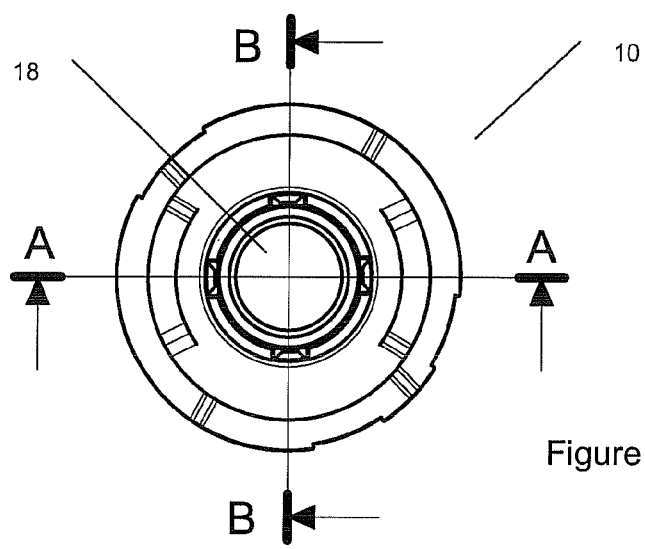
FIG. 5b shows a top view showing the flange of a shaft
Figure 5C:
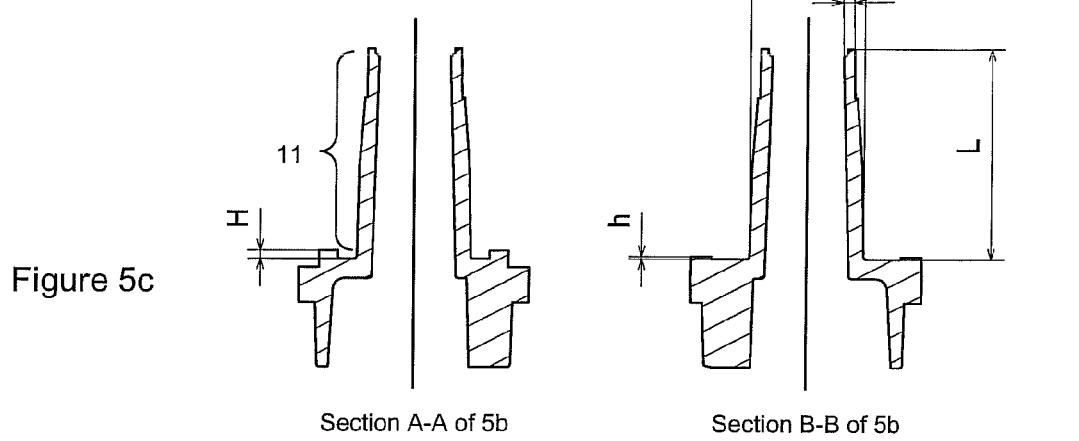
FIG. 5c shows a cross sectional view showing a shaft

In FIG. 1 a wing mirror with a base 100 and a mirror head 50 is shown. A shaft 10 is fixed on the base 100 and the rest of power fold module 30 is mounted on the mirror head 50.

This mechanism is working in that the power fold module 30 including the mirror head 50 rotates around the shaft 10 to the specific position (fold-in position and operational position).

The shaft 10 which is an axis for rotation to specific position of the mirror head 50 is mounted on the base 100 of the wing mirror. Details of the shaft are shown in FIG. 7a. The circumference surface of the shaft 10 has shaft projections 13-1, 13-2, 14-1, 14-2 arranged along two radii of regular angle on the shaft flange 12 for controlling fold-in position 71 and neutral position 70 of the power fold module.

The center of the shaft 10 is open and allows a wiring through the hole. In a preferred embodiment the harness of the mirror head passes completely through the hole to connect mirror head with the vehicle's electrical system. The shaft 10 has a long tube-like body to be assembled to a gearbox 20. This shaft projecting part 11, has a regular external diameter $\phi\theta$, a wall thickness t and a length L for strong support of power fold module and mirror head part.

The lower portion of shaft projecting part 11 forms the wiring hole 18 that is surrounded by a shaft flange 12. Between outer side of the shaft flange 12 and the shaft projecting part 11 shaft inner projections 13-1, 13-2 and shaft outer projections 14-1, 14-2 are arranged.

Shaft inner projections 13-1, 13-2 are symmetrically formed around the opening of the wiring hole 18. The shaft outer projections 14-1, 14-2 are formed at the outer side of the shaft flange 12 and symmetrically formed around basis of wiring hole 18.

All shaft projections 13-1, 13-2/14-1, 14-2 are spaced apart 90° from each other. The shaft projections 13-1, 13-2/14-1, 14-2 have specific slopes α at the end faces of the projections. The radial lengths of the projections are defined by angles Q1, Q1', Q2, Q2' of radial shape as shown in FIG. 6a.

The end faces inclined by angle α form the shaft stopper parts 15, 16 of the shaft projections 13-1, 13-2, 4-1, 14-2. The shaft stoppers parts 15, 16 support the end stop positions for the wing mirror, when power fold module is stopped in neutral position 70 or fold-in position 71.

In neutral position 70 or fold-in position shaft inner stopper parts 15 and faces of shaft outer stopper parts 16 are in contact with gearbox inner stopper parts 24 and gearbox outer stopper parts 25 at the same time. The close connection of shaft and gear box allows a stable solution for the pivotable wing mirror.

When the mirror head part 50 of wing mirror is rotated from neutral position 70 to fold-over position 72 due to an external impact, four faces of shaft stopper parts 15, 16 contact four faces of gearbox stopper parts 24, 25 which allows a stable end position.

After the mirror head part 50 overcomes the shaft stopper parts 15, 16 by compulsion impact, it is possible to use the hand or a switch which is installed in vehicle for return to drive position 70.

The gear box 20 of FIG. 7b has cylindrical hole 28 which has specific dimension to allow assembling of shaft projection 11. The hole 28 is surrounded by the gearbox circular working face 27 that forms the correspondence surface to the friction surface of shaft 10 for sliding and/or rotation on friction surfaces. The surface 27 in the gear box 20 includes a metal plate 40 that reduces the slide coefficient and the abrasive degrading of the surface. The gear box is manufactured by injection molding of high stiffness plastic, the thin metal plate 40 is inserted after molding process into the gearbox 20 for preventing damage when mirror is rotated fold over position by external impact.

The outer radius of gearbox circular working face 27 includes gearbox projections 22-1, 22-2, 23-1, 23-2 which correspond to four related intermediate spaces between shaft projections 13-1, 13-2/14-1, 14-2. The size of the gearbox projections 22-1, 22-2, 23-1, 23-2 is smaller than the intermediate space provided by shaft projections 13-1, 13-2, 14-1, 14-2. Therefore it is enough space for rotating the neutral position 70 into fold-in position 71.

Furthermore, said gearbox outer projections 23-1, 23-2 are formed along an circle with a bigger radius than the gearbox inner projections 22-1, 22-2 are positioned between radial spaces between shaft outer projections 13-1, 13-2.

Figure 8:
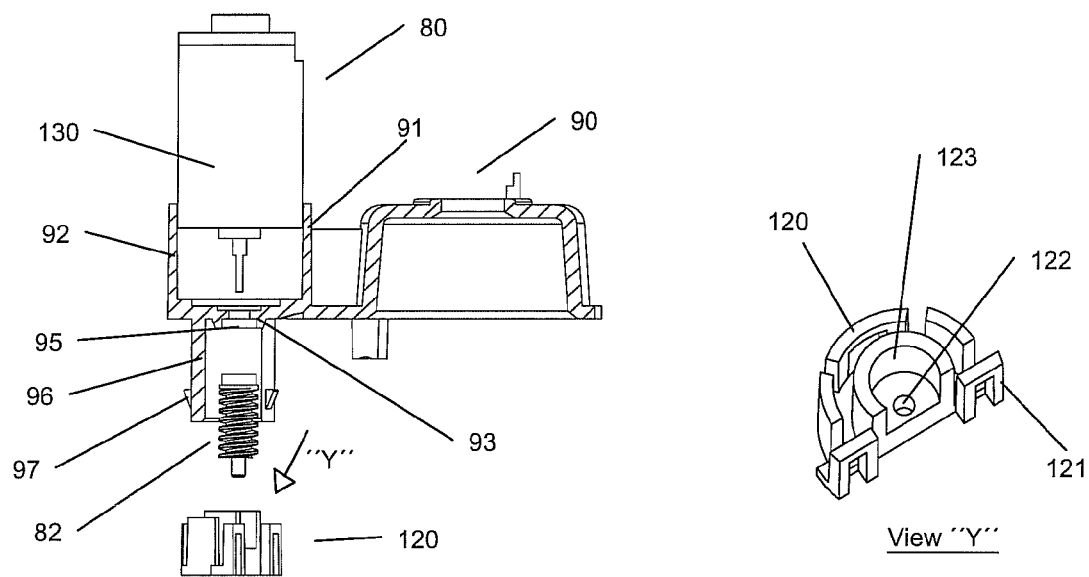
FIG. 8 shows a partial assembly drawing of an upper case
Figure 9:
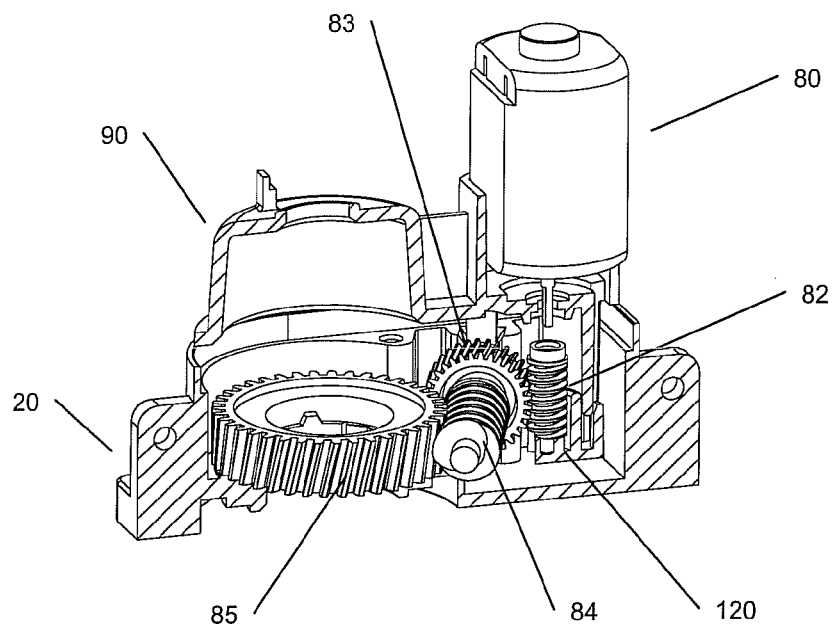
FIG. 9 shows a partial assembly drawing of a gearbox

FIG. 8 shows a partial assembly drawing of upper case 90, motor worm 82 and worm cap 120 from power fold module 30.

An axis separation part 93 which is formed in the middle tier of upper case 90 is upholding the top side of motor worm 82. A worm cap 120 which is inserted in the lower tier of upper case 90 is a separate part and is upholding the lower side of motor worm 82. With this separation between shaft of motor 80 and shaft of motor worm 82 the initial moving noise and vibrations are removed and the driving force is decoupled when the mechanism is stopped.

And also the upper tier of said upper case 90 has a socket 91 which has a u-shaped form. The socket 91 hosts the motor 80 for power transmission in the upper case. The socket 91 has an equivalent size to the size of the motor 80 with the motor case 130.

Motor case 130 is inserted into u-shaped socket 91. The thickness of the u-shaped socket 91 is small to remain a flexibility for easy inserting motor case 130. The lower tier of socket 91 has an opening 94 for the motor shaft and lower tier of the opening 94 has a bearing element 95 which is formed integrally into the body of the socket 91.

The upper case forms in addition a supporter 96 for installing the worm cap bearing 122. The supporter 96 has hook projections 97 on the outer surface for fixing worm cap 120 which functions as second bearing element for the motor worm.

Worm cap 120 has hooks 121 for installing and mounting the worm cap to upper case 90 by using hook projections 97. The center of worm cap 120 forms worm cap bearing 122 which supports motor worm.

A motor worm 82 is installed between the bearing 95 of upper case 90 and worm cap bearing 122 of worm cap 120. The motor worm transfers the rotation force of the motor 80 to worm wheel gear 83. Motor worm 82 is a reduction gear in the gear drive of the power fold module.

Around the center of the worm cap 120 a worm cap projection 123 is formed. The worm cap projection 123 prevents the worm cap 120 to move when worm cap is installed in the upper case 90, maintenance a pivot and prevention of torsion when mechanism is working.

Figure 10:
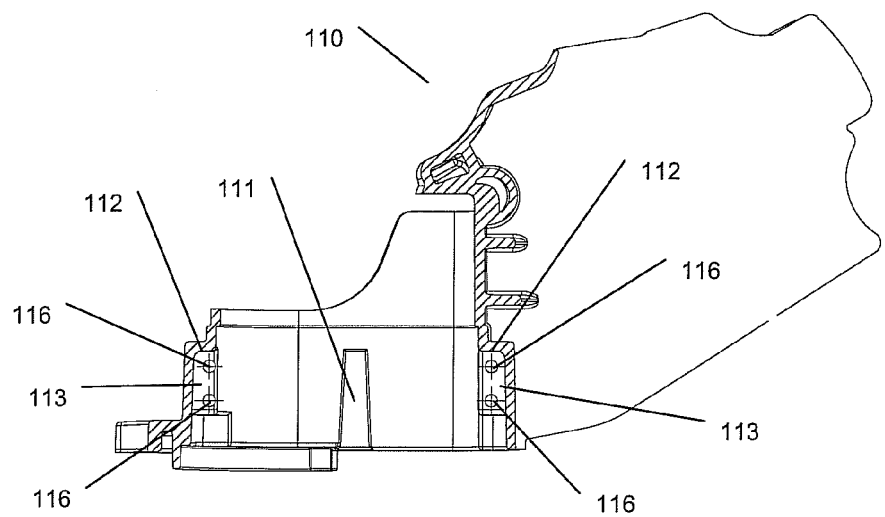
FIG. 10 shows a cross sectional view showing a frame of outside mirror
Figure 11:
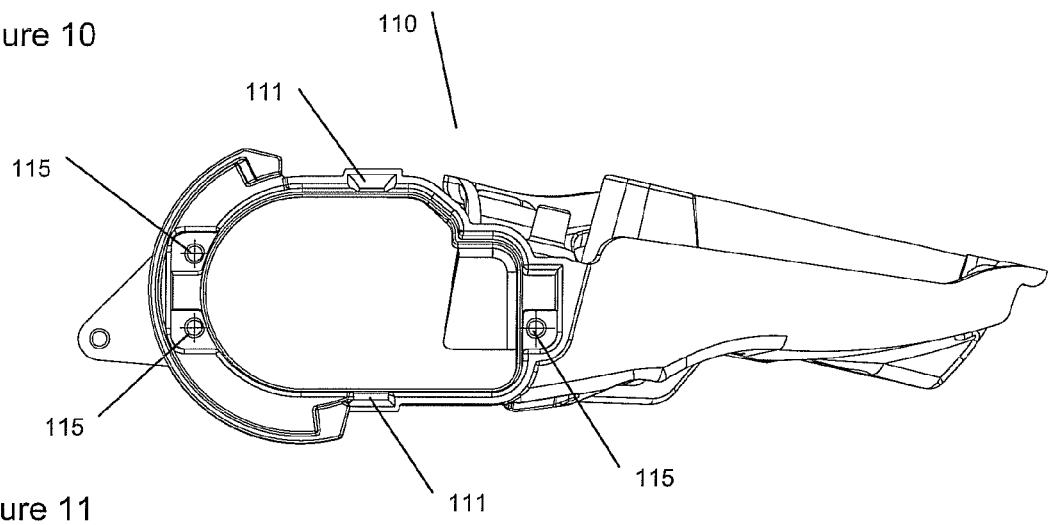
FIG. 11 shows a bottom view showing the frame of outside mirror

FIG. 10 shows a sectional view of frame 110. The frame 110 is a part of the wing mirror and hosts power fold module 30 into the mirror.

Frame 110 has horizontal space 112 and a vertical space 113 in the front and rear side, this spaces offer a regular matching plane when power fold module 30 is assembled and the therefore reduce assembly errors.

The frame 110 has a location guide 111 which formed left-right symmetry. The location guide 111 is matching to a location rib 34 of the power fold module 30.

The location guide 111 has two functions: first to guide the devices during assembling, and second to reduce the motion of power fold module 30 when the mechanism is working.

Figure 12:
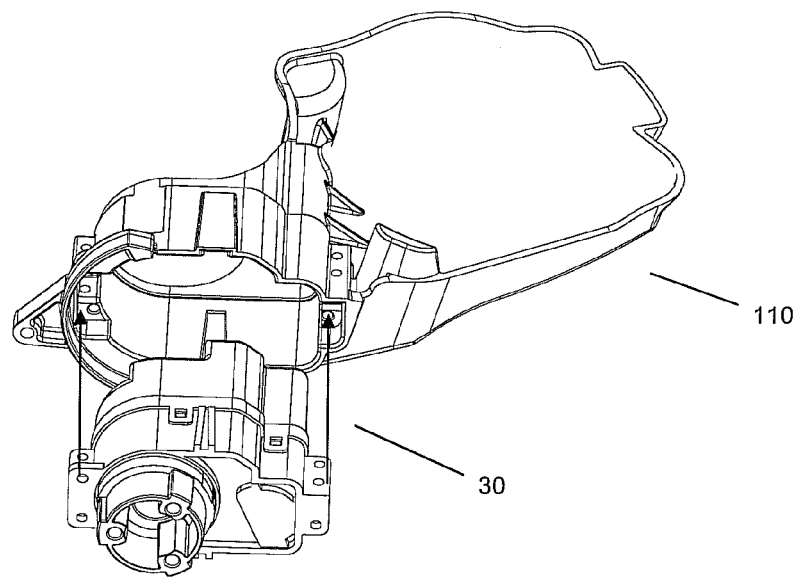
FIG. 12 shows an assembly drawing of frame of outside mirror.

The power fold module 30 is mounted along the arrows in FIG. 12. The power fold module 30 is fixed to the frame 110 using fixation holes 32 of gearbox 20 and fixation holes 115 of frame 110. In an alternative embodiment use the module side fixation hole 33 of the gearbox 20 is used to fix the module to frame side fixation hole 116.

Legend

10. Shaft
11. Shaft projection
12. Shaft flange
13. Shaft inner projection
14. Shaft outer projection
15. Shaft inner stopper
16. Shaft outer stopper
17. Shaft rotative working face
18. Wiring hole
20. Gearbox
22. Gearbox inner projection
23. Gearbox outer projection
24. Gearbox inner stopper
25. Gearbox outer stopper
26. Gearbox rotative part
27. Gearbox rotative working face
28. Gearbox hole
30. Power fold Module
32. Under fixation hole
33. Side fixation hole
34. Location rib
40. Metal plate
50. Mirror head
60. Pivot
70. Drive position
71. Fold-in position
72. Fold-over position
80. Motor
81. PCB
82. Motor worm
83. Worm wheel
84. Clutch worm
85. Clutch gear
86. Spring
87. Seal cover
90. Upper case
91. Socket
92. Thickness of socket
93. Axis separation part
94. Opening
95. Bearing
96. Supporter
97. Hook projection
100. Base
110. Frame
111. Location guide
112. Horizontal space -continued Legend 113. Vertical space
115. Frame fixation hole
116. Frame side fixation hole
120. Worm cap
121. Hook
122. Worm cap bearing
123. Worm cap projection
130. Motor case

The invention claimed is:

1. A hinge construction for a wing mirror unit for a motor vehicle, the hinge construction comprising:
a first hinge part for mounting on the motor vehicle;
a second hinge part pivotably connected to the first hinge part via a shaft, for supporting a mirror frame of the wing mirror unit, wherein the shaft is connected with one of the first and second hinge parts and wherein the other of the first and second hinge parts is arranged pivotably about the shaft; and
a power fold module including a motor having an output shaft, a motor worm secured to the output shaft, and a worm cap, the power fold module formed by a gear box, an upper case and a seal cover, the upper case including a socket and an axis separation part with the axis separation part disposed between the motor and the motor worm with the output shaft extending through the axis separation part, with the socket, the axis separation part, the motor and the motor worm being coaxial with each other, the axis separation part including a bearing and the motor worm is borne between the bearing and a worm cap bearing in the worm cap, wherein the worm cap is snapped to the upper case.

2. A hinge construction for a wing mirror unit according to claim 1, characterized in that the mirror frame has a location guide that corresponds with a location rib of a power fold module to be inserted.

3. A hinge construction for a wing mirror unit according to claim 1 characterized in that the worm cap has a worm cap projection and hook projections which snap lock with the upper case.

4. A hinge construction for a wing mirror unit according to claim 1 characterized in that the socket has a small wall thickness for a flexible hosting of the motor.

5. A hinge construction for a wing mirror unit according to claim 1 characterized in that the gear box comprises two radial arranged types of projections that correspond to the shaft inner and outer projections and a metal plate protecting the friction surface of the gear box.

6. A hinge construction for a wing mirror unit according to claim 1 characterized in that the socket is U-shaped in cross section.

7. A hinge construction for a wing mirror unit for a motor vehicle, the hinge construction comprising:
a first hinge part for mounting on the motor vehicle;
a second hinge part pivotably connected to the first hinge part via a shaft, for supporting a mirror frame of the wing mirror unit, wherein the shaft is connected with one of the first and second hinge and wherein the other of the first and second hinge parts is arranged pivotably about the shaft; and
a power fold module including a motor having an output shaft, a motor worm secured to said output shaft, and a worm cap, the power fold module formed by a gear box, an upper case and a seal cover, the upper case including a U-shaped socket and an axis separation part with the axis separation part disposed between the motor and the motor worm with the output shaft extending through said axis separation part, and the motor worm is borne between a bearing in the U-shaped socket and a worm cap bearing in the worm cap, wherein the worm cap is snapped to the upper case.

8. A hinge construction for a wing mirror unit according to claim 7, wherein the mirror frame has a location guide that corresponds with a location rib of a power fold module to be inserted.

9. A hinge construction for a wing mirror unit according to claim 7, wherein the worm cap has a worm cap projection and hook projections which snap lock with the upper case.

10. A hinge construction for a wing mirror unit according to claim 7, wherein the socket has a small wall thickness for a flexible hosting of the motor.

11. A hinge construction for a wing mirror unit according to claim 7, wherein the gear box comprises two radial arranged types of projections that correspond to the shaft inner and outer projections and a metal plate protecting the friction surface of the gear box.

* * * * *